US008676868B2

(12) United States Patent
Jones et al.

(10) Patent No.: US 8,676,868 B2
(45) Date of Patent: Mar. 18, 2014

(54) MACRO PROGRAMMING FOR RESOURCES

(75) Inventors: Scott A. Jones, Carmel, IN (US);
Thomas A. Cooper, Carmel, IN (US);
Brandon Fischer, Carmel, IN (US)

(73) Assignee: ChaCha Search, Inc, Carmel, IN (US)

( * ) Notice: Subject to any disclaimer, the term of this patent is extended or adjusted under 35 U.S.C. 154(b) by 370 days.

(21) Appl. No.: 11/462,559

(22) Filed: Aug. 4, 2006

(65) Prior Publication Data

US 2008/0033917 A1 Feb. 7, 2008

(51) Int. Cl.
*G06F 7/00* (2006.01)
*G06F 17/00* (2006.01)
*G06F 17/30* (2006.01)

(52) U.S. Cl.
USPC .......................... 707/899; 707/803; 707/807

(58) Field of Classification Search
USPC ........ 709/206, 203; 707/706; 704/275; 713/2
See application file for complete search history.

(56) References Cited

U.S. PATENT DOCUMENTS

| | | | |
|---|---|---|---|
| 6,098,081 A * | 8/2000 | Heidorn et al. ............... | 715/200 |
| 6,263,375 B1 * | 7/2001 | Ortega ........................ | 704/275 |
| 6,321,228 B1 | 11/2001 | Crandall | |
| 6,389,507 B1 * | 5/2002 | Sherman ...................... | 711/108 |
| 6,490,579 B1 | 12/2002 | Gao | |
| 6,526,402 B2 | 2/2003 | Ling | |
| 6,564,222 B1 | 5/2003 | Sassano | |
| 6,594,654 B1 | 7/2003 | Salam | |
| 6,601,061 B1 | 7/2003 | Holt | |
| 6,625,624 B1 | 9/2003 | Chen et al. | |
| 6,732,088 B1 | 5/2004 | Glance | |
| 6,766,320 B1 | 7/2004 | Wang | |
| 6,772,139 B1 | 8/2004 | Smith, III | |
| 7,010,568 B1 | 3/2006 | Schneider et al. | |
| 7,113,939 B2 | 9/2006 | Chou | |

(Continued)

FOREIGN PATENT DOCUMENTS

EP  1 469 401    10/2004
WO  0101277 A3   1/2001

(Continued)

OTHER PUBLICATIONS

Adobe Flash (previously called Shockwave Flash and Macromedia Flash) from Wikipedia, the free encyclopedia, since 1996.*

(Continued)

*Primary Examiner* — Susan Chen
(74) *Attorney, Agent, or Firm* — Staas & Halsey

(57) ABSTRACT

A system and a method are disclosed for generating, storing, retrieving, and utilizing a search macro or shortcut link to a resource, such as a web site that provides access to an information database. The system may load a page into an application from the resource. The resource may have a Uniform Resource Identifier, and the page may have a search field that causes the application to generate a message when activated. The system may read the Uniform Resource Identifier insert a placeholder into the search field, and activate the search field, which causes the application to generate a message. The system may read the message and parse the message to isolate a search string containing the placeholder. The system may store the search string in a data structure, and may also store the Uniform Resource Identifier and associate it with the search string in the data structure. The system may further retrieve the search string, replace the placeholder with a search term, and generate a message as a function of the search string and the search term.

23 Claims, 11 Drawing Sheets

(56) References Cited

U.S. PATENT DOCUMENTS

| | | |
|---|---|---|
| 7,165,119 B2 | 1/2007 | Fish |
| 7,231,405 B2 | 6/2007 | Xia |
| 7,343,412 B1 * | 3/2008 | Zimowski ............... 709/203 |
| 7,698,327 B2 * | 4/2010 | Kapur ..................... 707/706 |
| 2002/0010745 A1 * | 1/2002 | Schneider ............... 709/206 |
| 2002/0099694 A1 * | 7/2002 | Diamond et al. ............ 707/3 |
| 2002/0140715 A1 | 10/2002 | Smet |
| 2002/0165856 A1 | 11/2002 | Gilfillan |
| 2002/0198962 A1 | 12/2002 | Horn et al. |
| 2003/0101238 A1 | 5/2003 | Davison |
| 2003/0182142 A1 * | 9/2003 | Valenzuela et al. ........... 705/1 |
| 2004/0167931 A1 | 8/2004 | Han |
| 2004/0205061 A1 | 10/2004 | Nakazato et al. |
| 2004/0225491 A1 | 11/2004 | Chang |
| 2005/0080786 A1 | 4/2005 | Fish |
| 2005/0165743 A1 | 7/2005 | Bharat |
| 2005/0171936 A1 | 8/2005 | Zhu |
| 2005/0240756 A1 * | 10/2005 | Mayer ....................... 713/2 |
| 2006/0020587 A1 | 1/2006 | Kausik |
| 2006/0026147 A1 | 2/2006 | Cone |
| 2006/0031778 A1 * | 2/2006 | Goodwin et al. ........... 715/781 |
| 2006/0074884 A1 | 4/2006 | Sawashima et al. |
| 2006/0248060 A1 | 11/2006 | Silverberg |
| 2006/0271537 A1 | 11/2006 | Chandrasekharan |
| 2006/0282336 A1 | 12/2006 | Huang |
| 2007/0016570 A1 | 1/2007 | Punaganti Venkata |
| 2007/0179847 A1 | 8/2007 | Jain |
| 2007/0179968 A1 | 8/2007 | Fish |
| 2007/0192206 A1 | 8/2007 | Manesh |
| 2007/0192300 A1 | 8/2007 | Reuther |
| 2007/0288437 A1 | 12/2007 | Xia |
| 2008/0228764 A1 * | 9/2008 | Soogoor ..................... 707/5 |

FOREIGN PATENT DOCUMENTS

| | | |
|---|---|---|
| WO | WO2004111873 A2 | 12/2004 |
| WO | WO2004111873 A3 | 12/2004 |
| WO | WO/2007/052285 | 5/2007 |

OTHER PUBLICATIONS

"URL" vs. "URI" Posted on Oct. 28, 2003 by Bernie, Zimmermann.*
U.S. Appl. No. 11/469,732, filed Jul. 10, 2006, Scott A. Jones, et al., Chacha Search, Inc.
U.S. Appl. No. 11/469,732, filed Sep. 1, 2006, Scott A. Jones et al., Chacha Search, Inc.
Larry Kerschberg, et al., A Personalizable Agent for Semantic Taxonomy-Based Web Search, In First International Workshop on Radical Agent Concepts, 2002, vol. 2564 of LNCS , http://eceb.gmu.edu/pubs/WebSifterWRACNH-Incs.pdf.
Wooju Kim, Larry Kerschberg, Anthony Scime, Learning for Automatic Personalization in a Semantic Taxonomy-Based Meta-Search Agent, Journal Title: Electronic Commerce Research, Date: 2002, vol. 1, Issue: 2, pp. 150-173, http://eceb.gmu.edu/pubs/WebSifterECRAJournal.pdf.
International Search Report issued May 28, 2008 in PCT/US07/73191.
International Preliminary Report on Patentability mailed Feb. 19, 2009 in PCT/US2007/073191 (U.S. Appl. No. 11/462,559).

* cited by examiner

MACRO PROGRAMMING FOR RESOURCES

BACKGROUND OF THE INVENTION

1. Field of the Invention

The present invention is directed to a method for utilizing a distributed computing system. In particular, a system and method are disclosed for creating shortcuts to accessing resources in a distributed computing system.

2. Description of the Related Art

The Internet is a vast computer network consisting of many smaller networks that span the world. A network provides a distributed communication system of computers that are interconnected by various electronic communication links and communication computer software protocols. Because of the Internet's distributed and open network architecture, it is possible to transfer data from one computer to any other computer worldwide. In 1991, the World-Wide-Web (WWW or Web) revolutionized the way information is managed and distributed.

Client side browsers, such as Mozilla Firefox, Apple Safari, and/or Microsoft Internet Explorer provide graphical user interface (GUI) based client applications that implement the client side portion of the Hypertext Transfer Protocol (HTTP), which is designed to run primarily over a Transmission Control Protocol/Internet Protocol (TCP/IP) connection. One format for information transfer is to create documents using Hypertext Markup Language (HTML). HTML pages are made up of standard text as well as formatting codes that indicate how the page should be displayed. The client side browser reads these codes in order to display the page.

A web page may be static and require no variables to display information or link to other predetermined web pages. A web page is dynamic when arguments are passed which are either hidden in the web page or entered from a client browser to supply the necessary inputs displayed on the web page.

A Uniform Resource Identifier (URI) is a compact string of characters for identifying an abstract or physical resource, and each name and addresses that refer to objects on the Internet may be reduced to a URI. One type of a URI is a uniform resource locator (URL), which is the address of a file accessible on the Internet. A URL contains the name of the protocol required to access the resource, a domain name, or an IP address that identifies a specific computer on the Internet, and a hierarchical description of a file location on the computer. In addition, the an optional ending of a URL may be a "?" followed by a query string having name/value pairs for parameters (e.g. "?size=small&quantity=3") or a "#" followed by a fragment identifier indicating a particular position within the specified document.

The URI "http://www.example.com:80/index.html#appendix" is the concatenation of several components where "http:" is the scheme or protocol, "//www.example.com" is the fully-qualified domain name having "www" as the host of the domain name "example.com", ":80" is the port connection for the HTTP server request, "index.html" is the filename located on the server, "#appendix" is the identifier to display a fragment of the HTML file called "index". The URL "http://www.example.com" also retrieves an HTML file called "index.html" on an HTTP server called "www.example.com". By default, when either a port or filename is omitted upon accessing an HTTP server via a URL, the client browser interprets the request by connecting via port 80, and retrieving the HTML file called "index.html".

In the current search environment, a user can access a search engine, such as Google™ or Yahoo!™ and perform a search. However, each time the user wishes to access a search engine, the user must first navigate to the "home page" of that search engine, enter search terms into a form on that home page, submit that form, and then wait for the results. Similarly, a variety of other resources, such as WebMD™, MapQuest™, LocalLive™, the U.S. Patent Office web site, and the like, provide a variety of different kinds of information that can be located by navigating to a search page and entering search terms. (The term "resource" as used herein refers to any computer system that is accessible via a network and that provides information in response to the submission of search terms). Some of these resources, such as the U.S. Patent Office web site, contain a variety of different search pages, which are located several levels below the home page.

Where a user of one or more resources is an amateur or professional researcher, such as an inventor or a patent searcher, the need to constantly navigate to a search page for each resource can be time consuming and frustrating. It would be desirable to provide a system and a method that allows an information seeker to create macros that allow for the rapid searching of a resource without manually navigating a browser to the resources search page. It would be further desirable to allow the information seeker to search one or more additional resources without either re-entering the search terms or manually navigating to the search pages of the additional resources.

Attempts have been made to assist inexperienced users by allocating humans to answer users' questions via a variety of mechanisms including via e-mail, via information posted at websites, and via library reference desks that are connected to users via "chat" sessions. However, there are many limitations imposed by these and other offerings including having limited pools of "experts", having latency in delivering results, having helpers who are not sufficiently knowledgeable to provide optimal results, etc.

SUMMARY

A system and a method are disclosed for performing generating and storing a search macro or shortcut link to a resource, such as a web site that provides access to an information database. The system allows future searches using the stored search macro associated with a resource. The system may load a page into an application by accessing the resource. The resource may have a Uniform Resource Identifier, and the page may have a search field that causes the application to generate a message when activated.

The system may read the Uniform Resource Identifier (URI), insert a placeholder into the search field, and activate the search field, which causes the application to generate a message. The system may read the message and parse the message to isolate a search string containing the placeholder. The system may store the search string in a data structure, and may also store the Uniform Resource Identifier and associate it with the search string in the data structure. This search string combined with the URI may be utilized to send future searches to the associated resource.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

The embodiments discussed herein relate to a method and apparatus for managing computer files containing documents and images of documents. In the following detailed description, numerous specific details are set forth in order to provide a thorough understanding of the embodiments. It will be apparent to one of ordinary skill in the art, however, that these specific details need not be used to practice the embodiments. In other instances, well-known structures, interfaces and processes have not been shown in detail in order not to unnecessarily obscure the description.

Figure 1A:
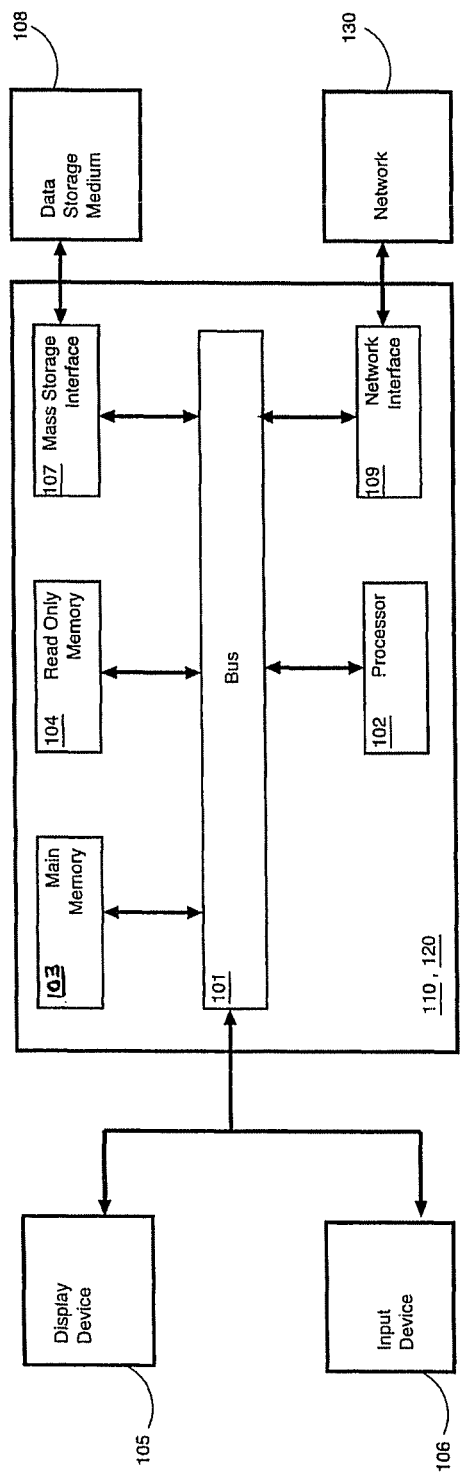
FIG. 1a depicts a system architecture of a computer system.
Figure 1B:
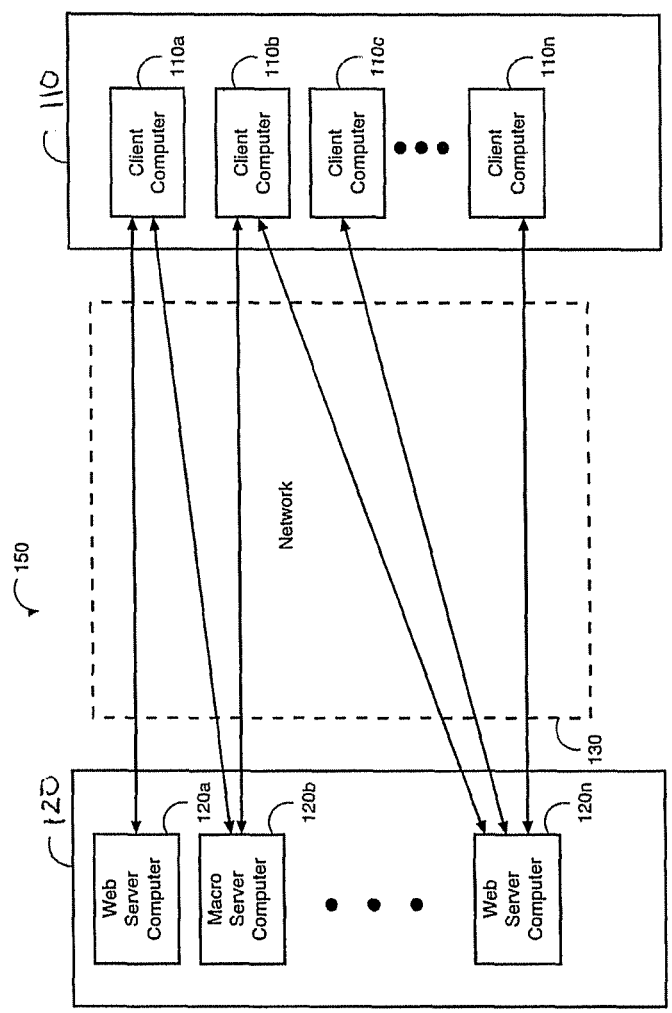
FIG. 1b depicts a system architecture of a distributed computer system.

A macro programming capability for resources provided by the system will be illustrated in FIGS. 1a and 1b. A request may be a query or keyword(s) submitted from an information seeker or user and may entail a fully-formed question, sentence, keyword or search phrase, for example, the closing time of a particular restaurant, information pertaining to a medical illness, or any other type of query. The macro programmed resources may be used by a requestor for conducting a search and/or a human searcher conducting a search on behalf of the requester. A provider, a guide or paid searcher (PaidSearchers™) is a human searcher who has registered to handle requests, who may be a professional, an amateur and/or volunteer searcher. A requester or an information seeker (InfoSeekers™) is a user or an entity submitting a request seeking information.

System Hardware

FIG. 1a illustrates an exemplary embodiment of a computer system 110, 120. In this disclosure, one or more client computers 110 communicate with one or more server computers 120, however, as will be appreciated by those of skill in the art, whether a given computer operates as a client or a server depends predominantly on the configuration of the software and/or firmware stored thereon. The preferred embodiment is implemented on a personal computer, a workstation computer, a laptop computer, a palmtop computer, or a wireless terminal having computing capabilities (such as a "cell phone" having a Windows CE or Palm operating system). It will be apparent to those of ordinary skill in the art that other computer system architectures may also be employed.

In general, computer systems such as those illustrated by FIG. 1 comprise a bus 101 for communicating information, a processor 102 coupled with the bus 101 for processing information, main memory 103 coupled with the bus 101 for storing information and instructions for the processor 102, a read-only memory 104 coupled with the bus 101 for storing static information and instructions for the processor 102, a display device 105 coupled with the bus 101 for displaying information for a computer user, an input device 106 coupled with the bus 101 for communicating information and command selections to the processor 102, a mass storage interface 107 for communicating with a data storage device 108 containing digital information, and a network interface 109 for communicating with a network 130.

The processor 102 may be any of a wide variety of general purpose processors or microprocessors such as the Pentium microprocessor manufactured by Intel Corporation, a Power PC manufactured by IBM Corporation, a SPARC processor manufactured by Sun corporation, or the like. It will be apparent to those of ordinary skill in the art, however, that other varieties of processors may also be used in a particular computer system.

The display device 105 may be a liquid crystal device (LCD), cathode ray tube (CRT), plasma monitor, display screen, text-to-speech converter, printer, plotter, fax, television set, or audio player. Although the input device is typically separate from the display device, they may be combined; for example: a display with an integrated touch screen, a display with an integrated keyboard, or a speech-recognition unit combined with a text-to-speech converter or other suitable display device.

The input device 106 may be any suitable device for the user to give input to client computer system 110, for example: a keyboard, a 10-key pad, a telephone key pad, a light pen or any pen pointing device, a touch screen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, and/or cable box. A data glove, an eye-tracking device, or any MIDI device may also be used as part of the input device 106. Although the input device is typically separate from the display device, they may be combined; for example: a display with an integrated touch screen, a display with an integrated keyboard, or a speech-recognition unit combined with a text-to-speech converter.

The mass storage interface 107 may allow the processor 102 access to the digital information on the data storage device 108 via the bus 101. The mass storage interface 107 may be a universal serial bus (USB) interface, an integrated drive electronics (IDE) interface, a serial advanced technology attachment (SATA), interface or the like, coupled with the bus 101 for transferring information and instructions. The data storage device 108 may be a conventional hard disk drive, a floppy disk drive, a flash device (such as a "jump drive" or SD card), an optical drive such as compact disc (CD) drive, digital versatile disc (DVD) drive, HD DVD drive, Blue-Ray DVD drive, or another magnetic, solid state, or optical data storage device, along with the associated medium (a floppy disk, a CD-ROM, a DVD, etc.).

The network interface 109 may be an IEEE 802.11 network interface card for communicating via Ethernet, a token ring, an AppleTalk, or a wireless local area network such as those described by IEEE 802.11(a)-(g). The network 130 may comprise a global network, such as the Internet, one or more other wide area networks (WAN), a local area network (LAN), wireless communication networks, a wireless local area network (WLAN), satellite networks, Bluetooth networks, a synchronous optical network (SONET), asynchronous transfer method (ATM) networks, integrated digital subscriber networks (ISDN), frame relay networks, proprietary networks such as provided by America Online, Inc., or other types of communications networks generally known to those skilled in the art. In the embodiment described herein, the network 130 is an Ethernet LAN and the network interface 109 substantially conforms to a wired or wireless variant of IEEE 802.11.

In general, the processor 102 retrieves processing instructions and data from the data storage device 108 using mass storage interface 107 and downloads this information into the random access memory 103 for execution. The processor 102, then executes an instruction stream from the random access memory 103 or the read-only memory 104. Command selections and information input at the input device 106 are used to direct the flow of instructions executed by the processor 102. The results of this processing execution are then displayed on the display device 105.

The preferred embodiment is implemented as a software module, which may be executed on a computer system such as the computer systems 110, 120 in a conventional manner. Using well known techniques, the application software of the preferred embodiment is stored on the data storage device 108 and subsequently loaded into and executed within the computer systems 110, 120. Once initiated, the software of the preferred embodiment operates in the manner described below. The processes and operations performed by the computer systems 110, 120 include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements.

A process may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering, etc., which are often associated with manual operations performed by a human operator. The operations described herein are machine operations performed in conjunction with various input provided by a human operator or user that interacts with the computer. The machines used for performing the operation of the present invention include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Distributed System Configuration

FIG. 1b illustrates an exemplary embodiment of a distributed computer system 150 that may include client computers or any network access apparatus 110 connected to server computers 120 via the network 130. The network 130 may use Internet communications protocols (IP) to allow clients 110 to communicate with servers 120. The network 130 may provide an on-line service, an Internet service provider, a local area network service, a wide area network service, a cable television service, a wireless data service, an intranet, a satellite service, or the like.

The client computers 110 may be any network access apparatus including hand held devices, palmtop computers, personal digital assistants (PDAs), notebook, laptop, portable computers, desktop PCs, workstations, and/or larger/smaller computer systems, as generally described above. It is noted that the network access apparatus 110 may have a variety of forms, including but not limited to, a general purpose computer, a network computer, an internet television, a set top box, a web-enabled telephone, an internet appliance, a portable wireless device, a game player, a video recorder, and/or an audio component, for example.

Each client 110 and server 120 may be similarly configured as client and server computers, as described generally above. However, in many instances server sites 120 include many computers, perhaps connected by a separate private network. In fact, the network 130 may include hundreds of thousands of individual networks of computers. Although the client computers 110 are shown separate from the server computers 120, it is understood that a single computer might perform the client and server roles.

The clients 110 in the distributed computer system 150 may submit search requests via the network 130 in a manner similar to the search system disclosed in application Ser. No. 11/336,928, titled A SCALABLE SEARCH SYSTEM USING HUMAN SEARCHERS, inventor Scott A. Jones, filed Jan. 23, 2006, in the United States Patent and Trademark Office, the disclosure of which is incorporated herein by reference. For example, when a user of client computer 110*a* may submit a search request to the system 150 requesting assistance in conducting a search pertaining to a particular subject matter, in response to which a human searcher, guide or provider may execute a search using a macro programmed resource and delivers results to the user.

Those skilled in the art will appreciate that the computer environment 150 shown in FIG. 1b is intended to be merely illustrative. The embodiments may also be practiced in other computing environments. For example, the embodiments may be practiced in multiple processor environments wherein the client computer includes multiple processors. Moreover, the client computer need not include all of the input/output devices as discussed above and may also include additional devices. Those skilled in the art will appreciate that the embodiments may also be practiced via Intranets and more generally in distributed environments in which a client computer requests resources from a server computer.

During operation of the distributed system 150, users of the clients 110 may desire to access information records stored by the servers 120 while utilizing, for example, the Web. Furthermore, such server systems 120 may also include one or more search engines having one or more databases. The records of information may be in the form of Web pages. The pages may be data records including as content plain textual information, or more complex digitally encoded multimedia content, such as software programs, graphics, audio signals, videos, and so forth. It should be understood that although this description focuses on locating information on the World-Wide-Web, the system may also be used for locating information via other wide or local area networks (WANs and LANS), or information stored in a single computer using other communications protocols.

The clients 110 may execute Web browser programs, such as Netscape Navigator or MSIE to locate the pages or records. The browser programs may enable users to enter addresses of specific Web pages to be retrieved. Typically, the address of a Web page is specified as a URI or more specifically as a URL. In addition, when a page has been retrieved, the browser programs may provide access to other pages or records by "clicking" on hyperlinks (or links) to previously retrieved Web pages. Such links may provide an automated way to enter the URL of another page, and to retrieve that page.

Software and Data Components

Figure 2:
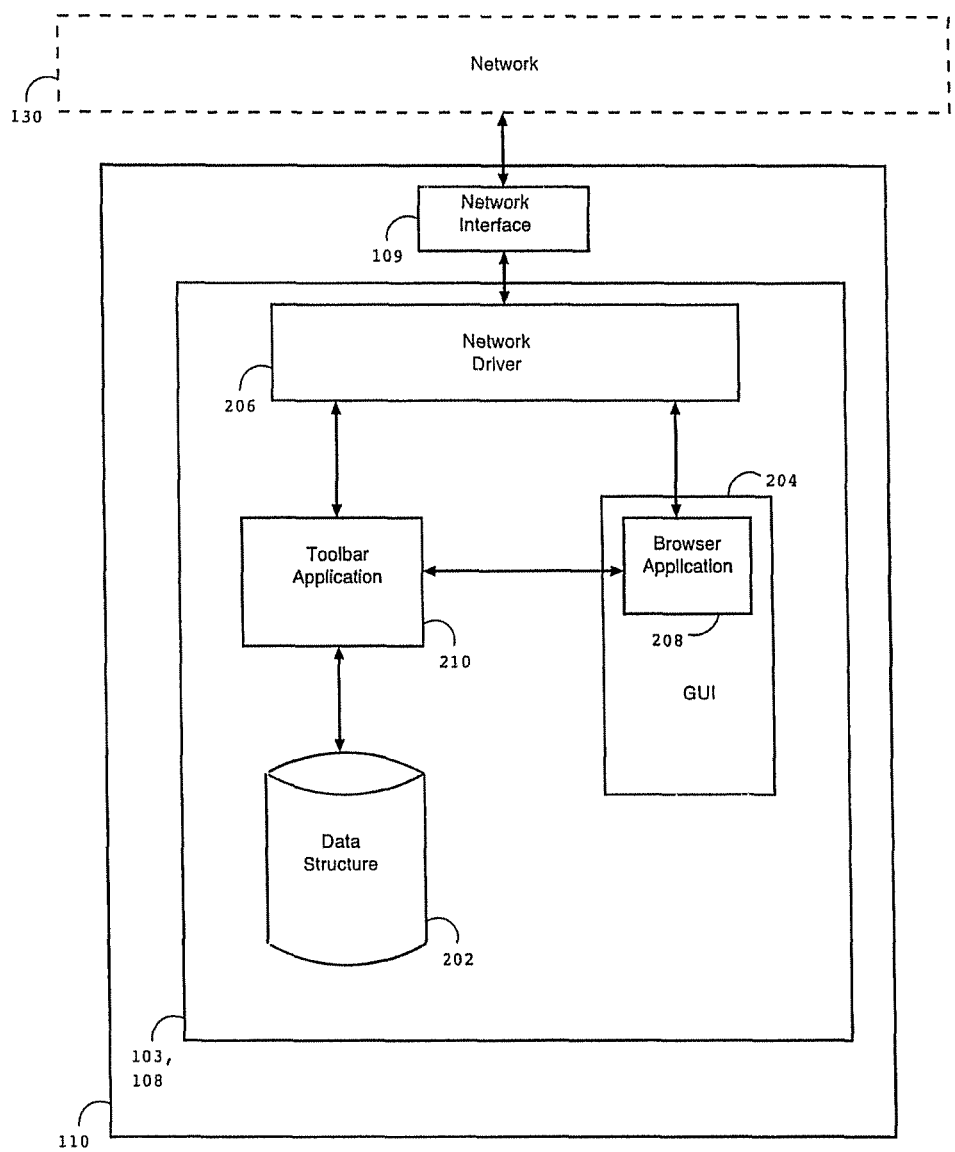
FIG. 2 depicts an architecture of a computer system.

Turning to FIG. 2, illustrative software and data components stored by the data storage medium 108 and the main memory 103 are shown. The components may include a data structure 202, a graphical user interface (GUI) 204, a network driver 206, and a toolbar application 210. The GUI 204 may have an associated GUI data structure or database (not shown) that stores the contents of each of the buttons (controls) and frames or fields. The entire contents of the GUI data structure can also be updated when events occur at a server 120, such as when the user navigates to a new web site.

The GUI 204 may store a browser application 208. For example, the browser application 208 may be any of the commercial browser applications described above, or a custom web browser application. The browser application 208 may generate a browser window 302, shown in FIG. 3. The toolbar application 210 may be a plug-in for the browser application 208. For example, the toolbar application 210 may generate widgets 316 and 318 that are included in the toolbar 306 of the browser window 302, as described in more detail below. Additionally, the toolbar application may contain an algorithm for creating search macros (or shortcuts) that allow the user to search resources without having to manually navigate to the URL of each resource.

The data structure 202 may include information regarding the macros. Although the data structure is shown as being stored in main memory 103 and/or data storage medium 108 of the client computer 110, in one embodiment, the data structure 202 may be stored in a memory of the server 120. In another embodiment, the data structure 202 is stored in the memories of both the client computer 110 and the server computer 120. Such an embodiment of the data structure 202 is illustratively shown in FIG. 5.

The toolbar application 210 and the browser application 208 may communicate with one another, for example, by inter-process communications, via shared memory locations, or by TCP or UDP connections, as are well-known in the art. In order to communicate with server applications on server computer 120, a network driver 206 may be employed. For example, the network driver 206 may implement the TCP/IP internet protocol, as well as Ethernet and/or other lower-layer protocols. The toolbar application 210 may communicate with a first server 120 via the network driver 206. Furthermore, the browser application 208 may communicate with a second server 120 via the network driver 206.

For example, the first server 120 may be a server on which the user has a personalized account, and on which the user has information regarding macros stored. The second server 120 may be, for example, a resource, such as a search engine used in a search such as described in U.S. patent application Ser. No. 11/336,928. As shown, this configuration may allow the user to retrieve information, such as a search macro, from the first server 120, load the search macro into the browser application 208, and transmit the search macro to the second server 120 via the network driver 206.

Macro Generation Graphical User Interface

Figure 3:
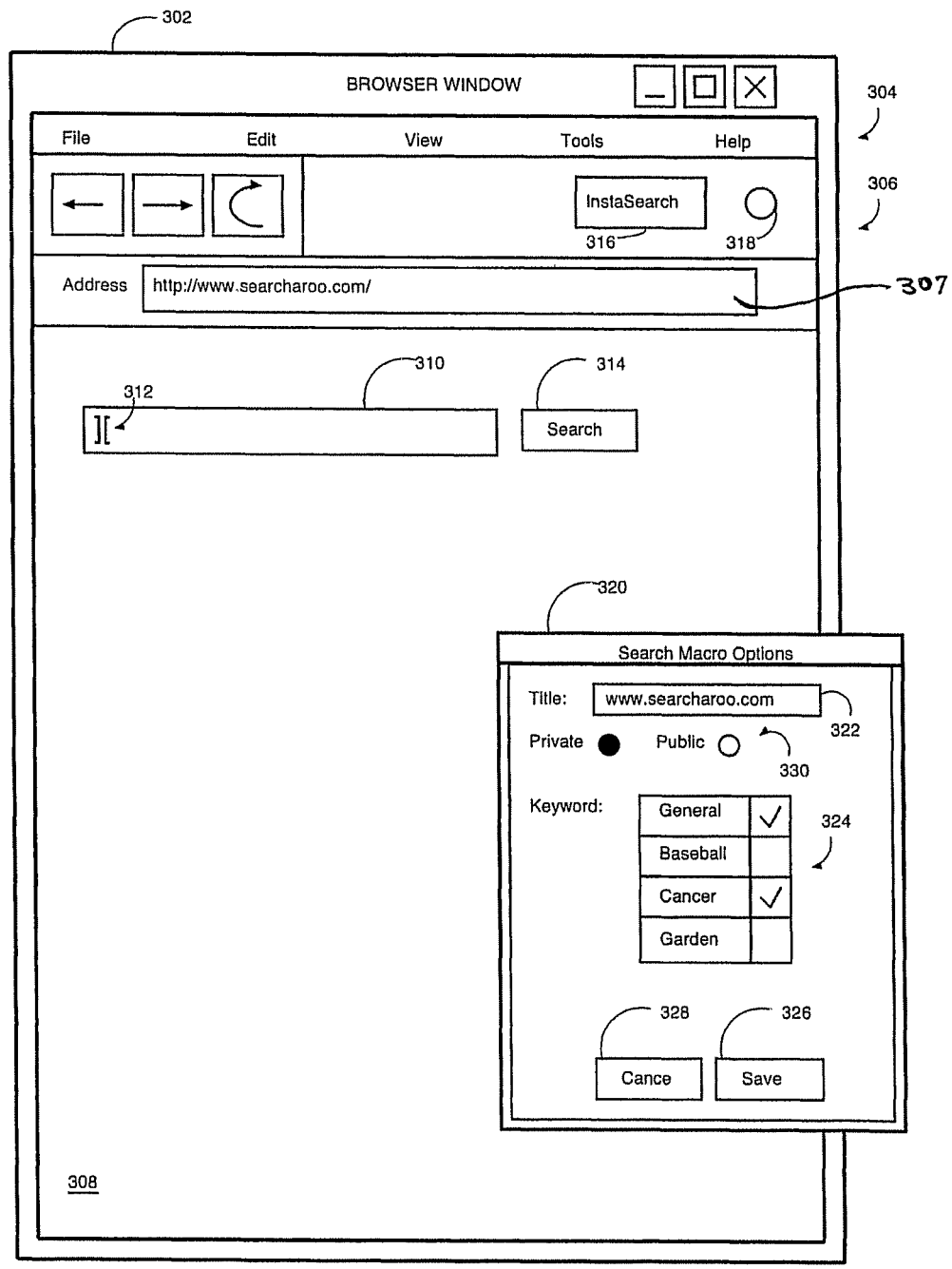
FIG. 3 depicts a first user GUI (graphical user interface)

As shown in FIG. 3, the browser application 208 generates a browser window 302 within the GUI 204. The browser window 302 may include a menu bar 304, as would be familiar to one accustomed to using an Internet web browser application. Additionally, the browser window 302 may include a toolbar 306, an address frame 307, and a display area 308, also familiar to persons using Internet browsers. The toolbar 306 may include the top-level widgets for a file menu, an edit menu, a view menu, and the like. Those familiar with using windowing operating systems will be familiar with the use of such a menu bar. The toolbar 306 may include widgets that allow the user to move back to a previous web page, forward to a next web page, to reload the current web page, and the like. The address frame 307 may provide a location for the entry of a URL address for a website to which the user wishes to navigate. The display area 308 may render the contents of the HTML or other source code contained at the address specified by the URL in the address frame 307.

FIG. 3 shows an illustrative search site www.searcharoo.com rendered in the display area 308. This search site includes a search frame 310 and a search button 314. The search frame 310 provides a frame into which a user may type a list comprising one or more search terms for which the user desires to gain additional information. In operation, once the user enters the search terms into the search frame 310, the user would activate the search button 314. Upon activating the search button 314, the web server that hosts the site would return a web page containing a list of search results, which would be displayed in the display area 308.

As explained above, for a user who conducts a large number of searches, especially a user that conducts searches using a variety of resources (web sites), a significant amount of time may be spent navigating from one search site to another, locating search frames (i.e., frame 310) at each site that may be buried deep within the site, and typing in the search terms. The more searches a user performs on different resources, the more significant this amount of time becomes. To decrease the amount of time spent "surfing" between sites, the toolbar application 210 generates an Instasearch button or control 316, and an indicator 318. (The title "Instasearch" is merely illustrative, and intended only to show that this button creates a macro for an "instant search." The name given to the button 316 is not relevant to the claimed invention). As described in more detail below, the Instasearch button 316 allows the user to create a search macro that will automatically send a properly formatted search request to the currently selected web server, without the need to navigate to the URI of the "search" page of said web server.

Macro Generation Algorithm

Figure 4A:
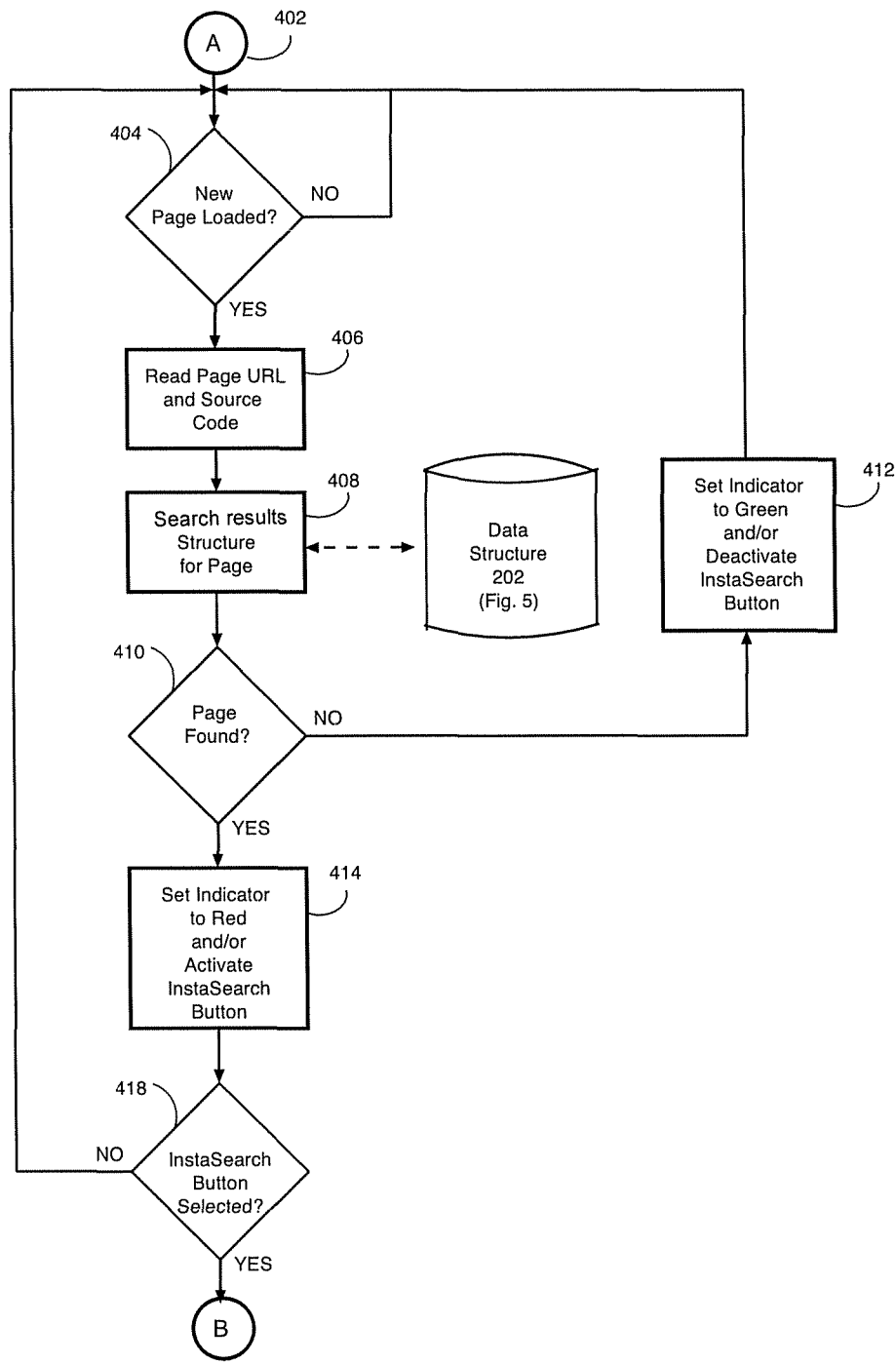
FIG. 4a is a flow chart for generating and storing a search macro.
Figure 4B:
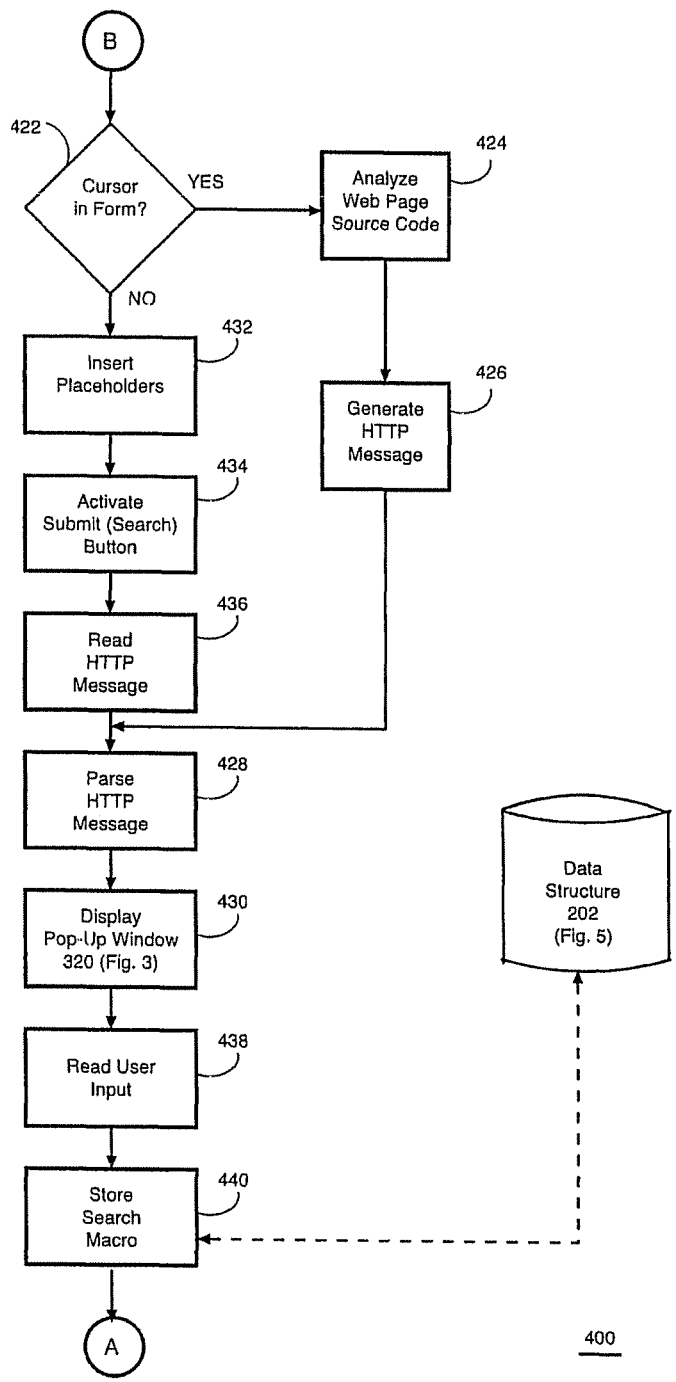
FIG. 4b is an exemplary flow chart illustrating generating and storing a search macro.

Turning to FIGS. 4a and 4b, flow charts for an illustrative algorithm to create and store a search macro is shown. The processor 102 enters the algorithm at 402. At 404, the processor 102 determines whether a new web page (URL) has been entered into frame 307, and loaded into display area 308. If not, then the processor waits at 404 until a new page is loaded.

If a new web page has been loaded, then at 406, the processor reads the URI and HTML of the web page. For example, the processor may determine the URL address of the web page, the path to the currently selected directory of the currently active web server 120, and a query string included in the URL, if one exists. Further, the processor may read the source code of the current web page, and determine the location of the frame 310 therein. Further, the processor may determine the action indicated in the source code to be carried out in response to the activation of the search button 314. For example, the processor may determine the format of an HTTP GET request, or an HTTP POST command generated by the activation of the search button 314.

At 408, the processor 102 may search the data structure 202 to determine whether a shortcut search already exists for the current website. For example, the processor 102 may search the data structure 202 using a key including the current domain name, the current directory path, and/or the current query string. At 410, the processor 102 may determine whether a shortcut search already exists for the current website in data structure 202.

If the processor 102 determines that a shortcut to the current page exists in the database, then at 412 the processor 102 may deactivate the Instasearch button 316, and set the color of the indicator 318, to, for example, green. It will be obvious to one of skill in the art that either deactivating button 316 or setting the color of the indicator 318 would be sufficient to communicate the existence of the shortcut to the current site. Furthermore, the indicator 318 is optional. In one embodiment, the Instasearch button 316 is not deactivated. In another embodiment, the indicator 318 is set to some other color, for example, to account for the fact that many users may be red/green colorblind. In such an embodiment, the indicator may, for example, be set to black or white, rather than to red or green. After setting the color of the indicator 318 and/or deactivating the Instasearch button 316, the processor returns to 404 to wait until a new page is loaded.

If at 410 the processor 102 determines that a shortcut to the current page is not found in the database 202, then at 414 the processor 102 may activate the button 316 and set the indicator color to red to indicate that no shortcut is in the database 202. As described above, the activation and deactivation of the button 316 the setting of the indicator 318 may be handled differently in different embodiments.

At 418, the processor 102 determines whether the button 316 has been activated. For example, a time-out may be set so that, after the time-out expires, it is presumed that the user will not activate the button 316, at which point the NO branch of the decision is executed. If the button 316 is not activated, then at 404 the processor determines whether a new page has been loaded into the browser window 302. If a new page has been loaded into the browser 302, then the processor progresses to 406 to read the URI and source code of the new page. If at 418 the processor 102 determines that the button 316 has been activated, then at 422 (FIG. 4B) the processor 102 determines whether the cursor 312 (shown in FIG. 3) is in the frame 310.

In one embodiment, if the processor determines at 422 that the cursor 312 is not in the frame or form, then the processor 102 analyzes the HTML or other code of the current website at 424. After the processor analyzes the code at 424, at 426 the processor 102 generates an HTTP GET message or an HTTP POST message, as indicated by the code. This message is substantially the same as a message that would be generated by browser application 208 under the control of the web page source code upon the activation of the search button 314. After the applicable message has been generated at 426, the processor 102 parses the generated message at 428. For example, the message may be parsed to determine the location of search terms in the message. (The parsing of the message is described in more detail below.)

If at 422 the processor 102 determines that the cursor 312 was in the frame 310 at the time the Instasearch button 316 was selected, then at 432 the processor 102 inserts placeholders into the frame 312. For example, the processor 102 may place into the frame 310 a string containing place holders, such as, "@1 @2 @3 @4 . . . @N". It will be appreciated by those of skill in the art that any type of placeholders will suffice for the purposes of the claimed invention, and that this string of placeholders shown here is merely illustrative. Inserting a number of placeholders in this fashion may facilitate the parsing of a request message generated by the web page. At 434, the processor 102 activates the search button 314. The activation of the search button 314 causes the browser 302 to generate a request message (such as a GET or a POST message, as described above). At 436, the processor 102 reads the request message generated by the browser 302.

At 428, the processor 102 parses the HTTP message that was either generated at 436 or 426. Because the processor 102 is able to generate a search string with easily identifiable placeholders, as described above, it is relatively easy to parse the HTTP message and determine the location of the search terms within that message. For example, a message generated using the search string "@1 @2 @3" by the search page of the Google website contains the following URL: "http://www.google.com/search?hl=en&lr=&q=@1+@2+@3". For a further example, a message generated by a search page of ESPN website contains this URL: "http://search.espn.go.com/keyword/search?searchString=%401 +%402+%403&Find.x=18&Find.y=13". As can be seen, the ESPN site substitutes "%40" for the "@" in the search string. Even so, because this is the standard ASCII hexadecimal representation for the "@" symbol, determining the location of the placeholders for the search terms in the message is still relatively simple. For websites that use a POST message, it will be a similarly simple task to parse the message and determine the location of the search terms. Additionally, in one illustrative embodiment, at 428 the processor 102 further formats the HTTP message to indicate the location of the search terms.

At 430, the processor 102 stores the request message along with a title, the directory path of the current search page of the website, and the link. In one embodiment, at 430 the processor 102 generates a pop-up window 320 (shown in FIG. 3). The pop-up window 320 may allow the user to select, for example, a title to associate with the macro, and keywords to associate with the macro. For example, the title 322 may be generated by the processor 102, and/or entered or edited by the user. The keyword table 324 may include keywords that have been previously selected by the user, or keywords from some other source.

Additionally, in one illustrative embodiment, the pop-up window 320 contains a frame (not shown) that contains the actual HTTP message, which may be edited by the user. This may be desirable, for example, for sites that have complex HTTP messages, or for advanced users who wish to edit the macros themselves for some other reason. Once the user has optionally selected keywords, and/or edited the title, the user may select the save button 326 to close the pop-up window 320. The information regarding the macro (link) as stored in the database 202 is shown in more detail in FIG. 5. Once this information has been stored in the database 202, the processor 102 may return to 402 and wait for a new web page to be loaded.

An illustrative HTTP GET message is shown in Table 1, below. The GET message in Table 1 is a request for a Google™ search using the search terms "@1 @2 @3". An illustrative HTTP POST message is shown in Table 2. The GET message includes a path that indicates data to be passed to a server-side program, the HTTP version (1.1), and the host (www.google.com).

TABLE 1

GET /search?hl=en&lr=&q=@1+@2+@3 HTTP/1.1
Host: www.Google.com

The POST message in Table 2 is a request for a search from the fictitious site searcharoo.com. The path to the server-side program is "/cgi-path/adv-search.cgi". The HTTP version is 1.0. The data to pass to the server side program is "query=@1&@2+@3", where, illustratively, "query" indicates that the desired action is a query, the ampersand indicates a Boolean "and" operator, and the plus sign indicates a Boolean "or" operator. For example, in this query string the resource would search for documents containing either both of the first two search terms, or the third search term. The use of Boolean operators as search parameters will be understood by those of skill in the art, as will the fact that other types of operators may be used, such as spelling out the words of the operation, without departing from the scope of the claimed invention.

TABLE 2

POST /cgi-path/adv-search.cgi HTTP/1.0
From: anonymous@searcharoo.com
User-Agent: HTTPTool/1.0
Content-Type: application/x-www-form-urlencoded
Content-Length: 14
query=@1&@2+@3

Figure 5:
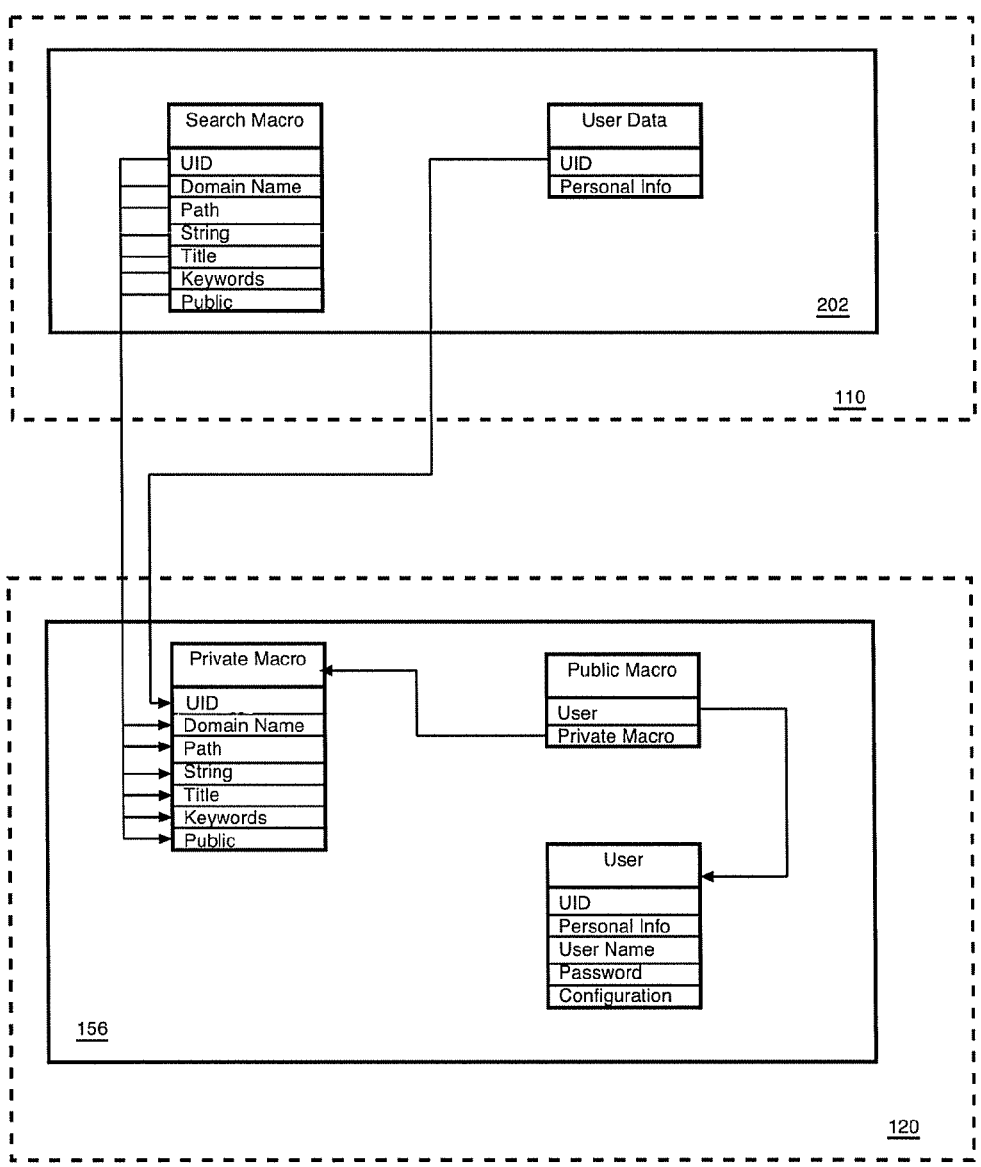
FIG. 5 illustrates a data structure.

Turning to FIG. 5, two illustrative data structures including information regarding quick-search macros, user data, and the like are shown. A first data structure 202 may be stored on the client computer 110. A second data structure 156 may be stored on the server computer 120. The data structures 202 and 156 may be relational databases that include related tables. For example, the data structure 202 may include a search macro table and a user data table. The search macro table may include information for each search macro (link, shortcut), such as a fully qualified domain name, a path, a string, a title, and key words, as these terms are described above. Additionally, the search macro table may include a public flag to indicate whether the user wishes to make this macro available to others. The user data table may include a unique identification (UID) for the user, and personal information about the user.

The data structure 156 may include a private macro table, a public macro table, and a user table. The user table may include information about a number of users of the server 120. For example, for each user, the table may include a unique identification, personal information, and configuration options, among other things. The private macro table may include, in addition to the information from the macro table, information for the user that (owns) a particular search macro. Additionally, the data structure 156 may include a public macro table. The public macro table may include, for each public macro, the unique identification of the user who (owns) the macro, and the associated private link.

This illustrative structure, by distributing data across a client computer 110 and a server computer 120, provides advantages. First, a user may be able to access his or her stored search macros from virtually any computer. For example, when the user accesses the server 120, the user may be able to download the toolbar application 210 to the current client computer 110. Additionally, because the user's private macros are stored on the server computer 120, any client computer 110 to which the user has access may be used as described herein. Additionally, because the server computer 120 stores a list of links for which users have indicated that the macros are public, the user may use macros that have been created by others, thereby saving the time that would be required by the user to create his our her own private macro links.

Macro Retrieval Graphical User Interface

Figure 6:
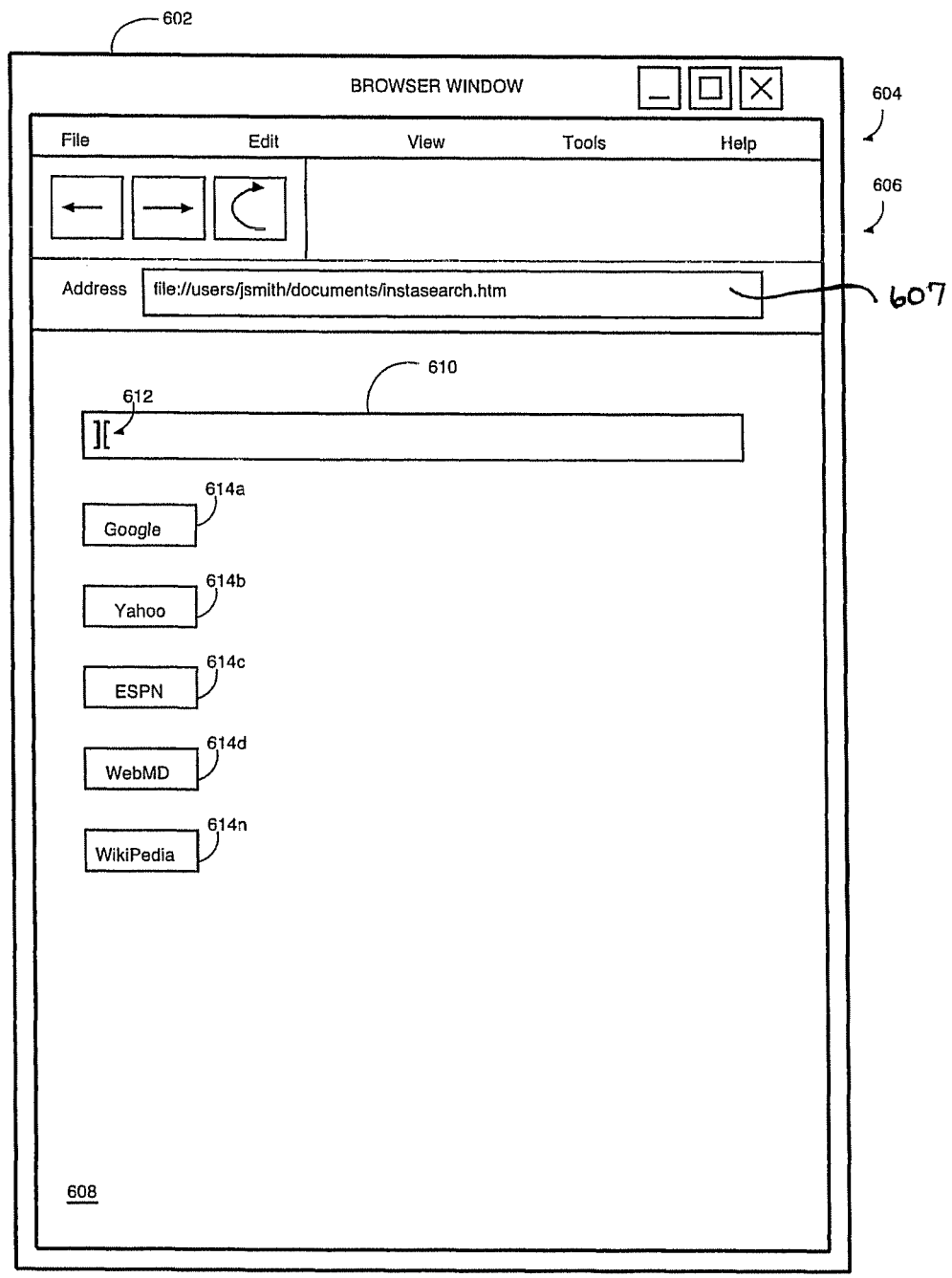
FIG. 6 depicts a second user GUI (graphical user interface)

As shown in FIG. 6, the browser application 208 may generate a custom search window 602 within the GUI 204 in order to provide the user with easy access to the links (macros) stored in the data structure(s). This custom search window 602 may be source code generated by the toolbar application. For example, whenever a new macro is stored at 440 of the algorithm 400, the source code of an "instasearch.htm" page may be updated in the data storage medium 108. It will be obvious to those of skill in the art that a multitude of such search windows, and that other types of data may be stored to generate the search window, such as Java, Pearl, C, Visual C++, Visual Basic, or any other computer language capable of generating a GUI windows.

The browser window 602 may include a menu bar 604, a toolbar 306, an address frame 607, and a display area 608, similar to the window 302 shown in FIG. 3 and discussed above. The display area 608 may include the top-level widgets for a file menu, an edit menu, a view menu, and the like. Those familiar with using windowing operating systems will be familiar with the use of such a menu bar. The toolbar 606 may include widgets that allow the user to move back to a previous web page, forward to a next web page, to reload the current web page, and the like. The address frame 607 may provide a location for the entry of a URL address for a website to which the user wishes to navigate. In one embodiment, the URL is the location of a file on the user's hard drive. In another embodiment, the URL is the location of a resource on the macro server computer 120b. In yet another embodiment, the URL is the location of a resource on the web server computer 120n.

The display area 608 may render the contents of the HTML or other source code contained at the address specified by the URL in the address frame 607. The illustrative search page includes a search frame 610 and one or more macro search buttons 614. The search frame 610 provides a frame into which a user may type a list comprising one or more search terms for which the user desires to gain additional information. In operation, once the user enters the search terms into the search frame 610, the user would activate one of the macro search buttons 614. For example, the user may activate the macro button 614a, which in the disclosed illustrative embodiment is a macro to the Google® search page. Upon activation of one of the macro search buttons 614, the associated macro is retrieved from the data structure, the search terms are substituted for the placeholders, and the resulting URL is transmitted onto the network 130, as explained in greater detail below in reference to FIG. 7.

Macro Retrieval Algorithm

Figure 7:
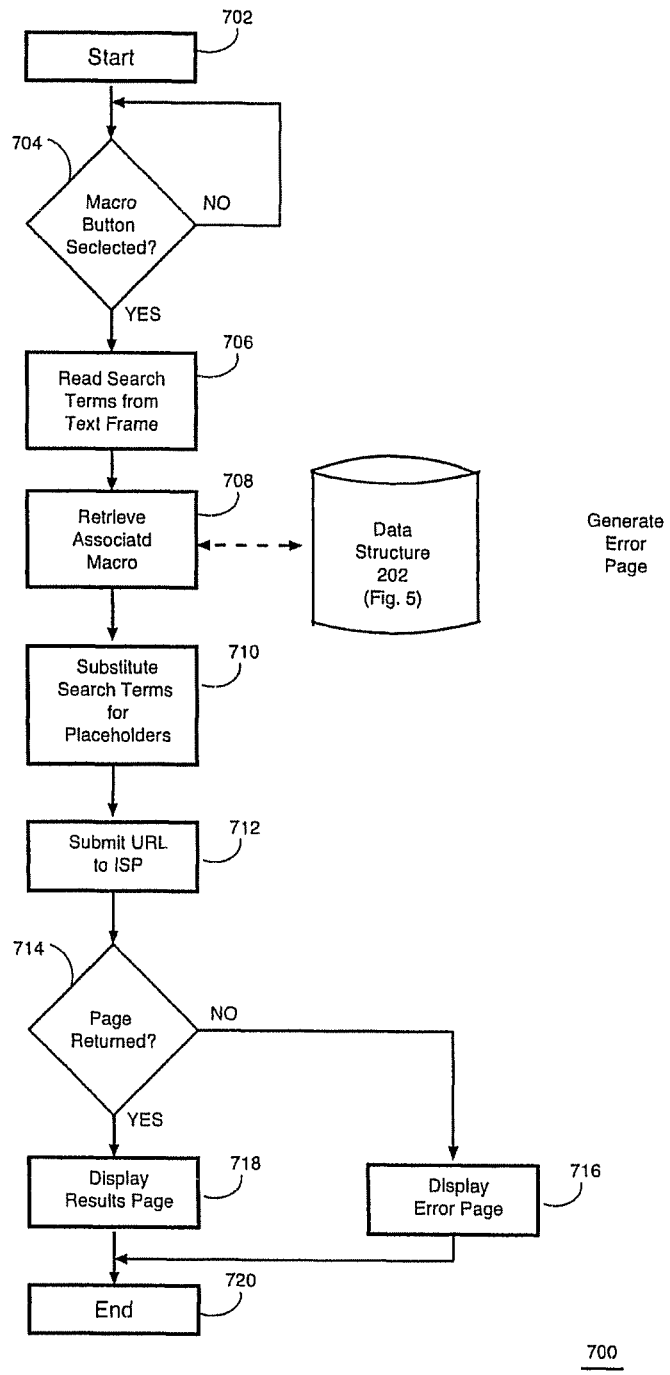
FIG. 7 is a flow chart for retrieving a search macro and generating a URL.

Turning to FIG. 7, a flowchart for an illustrative algorithm to generate a search page containing search macros is shown. The processor 102 enters the algorithm at 702. At 704, the processor 102 determines whether a macro button has been selected. For example, the processor determines whether one of the macro buttons 614 has been selected in the browser window 602 (FIG. 6). If no macro button 614 has been selected, then the processor waits at 704 until a macro button 614 is selected. Once a macro button is selected, then the processor 102 proceeds to 706 and reads the search terms from the text frame 610 of the browser window 602. At 708, the processor 102 retrieves the macro associated with the activated macro button 614 from the data structure 202. For example, if the Google® macro button 614a is selected, then the processor 102 would retrieve the macro for Google® from the data structure 602. For example, the processor 102 may retrieve the illustrative macro for Google® macro shown in Table 1.

At 710, the processor 102 substitutes the search terms from the text frame 610 for the placeholders in the retrieved macro. For example, if there are seven placeholders in the stored macro, and four search terms in the text frame 610, then the processor 102 would replace the first four placeholders with the four search terms, and discard the remaining three placeholders. It will be apparent to one of skill in the art that for more complex macros configured to use Boolean or other operators, the search terms from text frame 610 would first be parsed by a parser, and that the parsed results would be further processed by a lexical analyzer to distinguish operators from search terms, as is well known in the art.

After this substitution is completed at 710, the processor 102 at 712 transmits the newly generated URL (which is a function of the retrieved macro with the search terms substituted for the placeholders) via the network interface 109 to the network 130. The network 130 is, in one embodiment, accessed via an Internet service provider. However, as would be understood by those of skill in the art, this system and method may be used with a network that is not the Internet, in which case the URL would be submitted to the associated web sever via a frame relay, a direct connection, or the like.

At 714, the processor 102 determines whether a results page was returned from the network 130, contrasted with, for example, an error message or no response at all. If results were not returned, then at 716 the processor 102 generates an error message page (not shown) and proceeds to 720. If, on the other hand, at 714 the processor 102 determines that a results page was returned, then at 718 the processor displays the results page in the graphical user interface. For example, in one embodiment the results page may be displayed in a frame of the current window. In another embodiment, the results page may be displayed in a new browser window. In an embodiment configured for tabbed browsers, the results page may be displayed in a new tab of the current browser window. In yet another embodiment, the results page may overwrite the search macro page show in FIG. 6. Additionally, in one embodiment, the results page is further processed and displayed in a frame or window of a proprietary searching application. Once the results page is displayed, the processor exits the algorithm 700 at 720.

Figure 8:
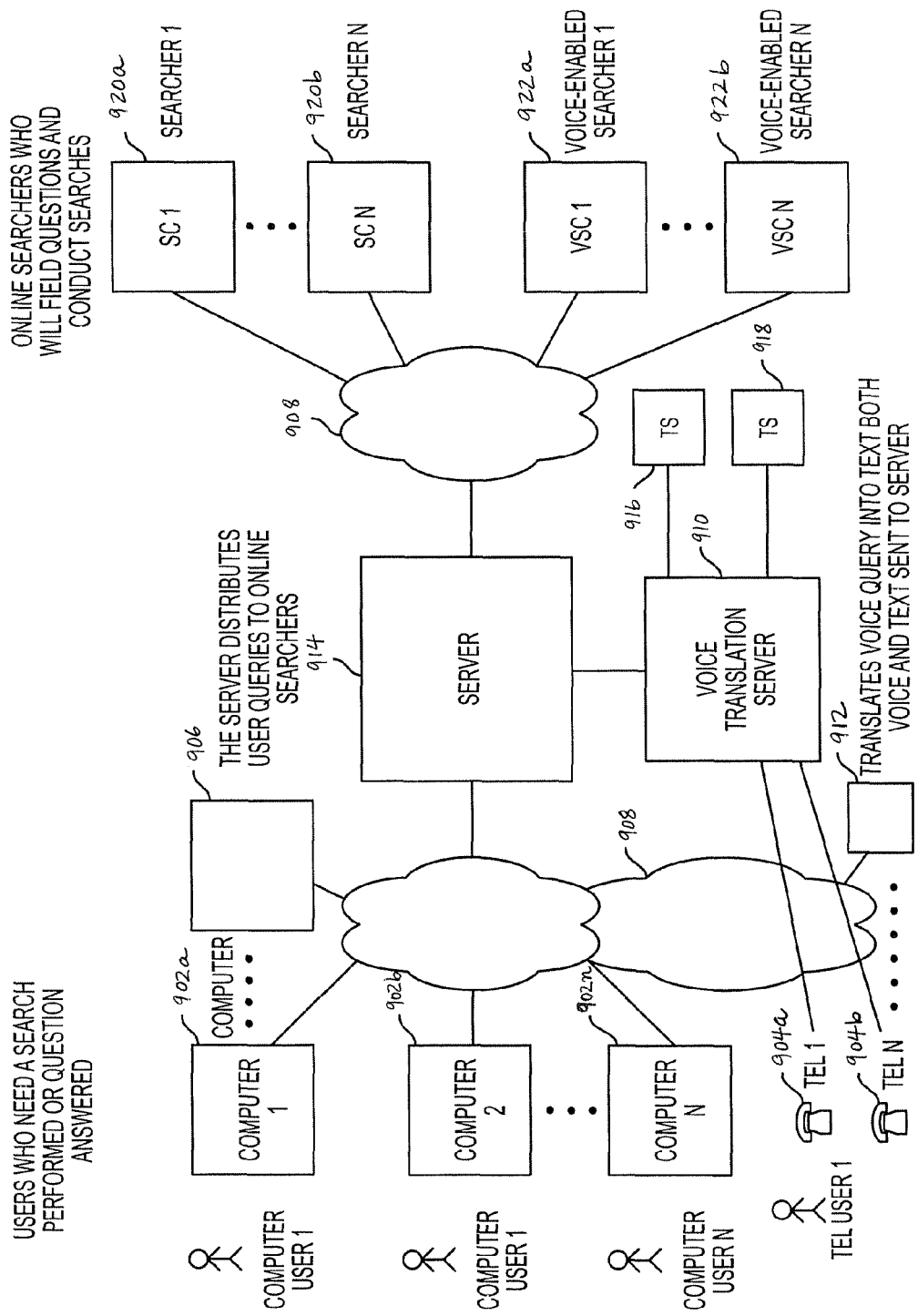
FIG. 8 is a system architecture for a human assisted search.

As depicted in FIG. 8, queries or search requests may originate from user computer systems 902a through 902n and are received over a communication system 908 or from telephone handsets 904a and 904b. As mentioned above, the user computer systems 902a through 902n may be a typical desktop or laptop system, a handheld computer such as a personal digital assistant (PDA), a basic cellular telephone, a text-enabled cellular telephone, a specialized query terminal, or any other source that allows a user to enter a query via text or speech entry. The telephone handsets can be typical touch-tone telephones, cellular telephones, two-way radios or any other communication device that allows the user to talk over a distance. The communication system can include packet switched facilities, such as the Internet, circuit switched facilities, such as the public switched telephone network, radio based facilities, such as a wireless network, etc.

The oral speech queries by telephone 904a and 904b may be stored in a database and converted into digital text queries by a speech translation system 910. The speech translation system 910 may handle the task of translating the speech into text, possibly by interaction with other systems, or it may perform the task locally. It may perform speech to text conversion by using either speech transcription using human transcribers or using conventional speech-to-text processing, also known as automatic speech recognition (ASR).

The speech (voice) translation server 910 may keep track of the port from which the call originated and assign a user identifier to the user 904a and 904b on this port for a particular session. The speech queries can also originate from another source 912 called a "speech query service requester" (SQSR) rather than directly from the user, such as a private or public information provider. For example, a speech query can be initially processed by a public library telephone system and switched to the server 910. The speech query may physically arrive at the system via a variety of input means, including time-division multiplexed lines, voice over IP (VOIP) packets from an Internet connection, and other sources. The speech query may arrive as a stream or packet or series of packets.

Similarly, a commercial site, such as a grocery store ordering system where a user orders food and inquires about recipes for a special after-dinner dessert can initially process a speech query and pass it along to the speech translation server 910. Further, the SQSR 912 may communicate with the speech translation server 910 via a variety of mechanisms including an IP-based socket address or via a Microsoft NET service, making the translation services of 910 widely available via the Internet to any application that wishes to use them.

The packet may then be processed locally at the speech translation server 910 to convert it from digitized speech into text or, alternatively, it may be processed by a remote system. If the digitized speech is being transcribed by human transcribers, this can be accomplished by sending the digitized speech to one or more transcriber systems (TS) 916 and 918 where human transcribers can hear the speech, for example via headphones or speakers, and transcribe the information by typing the text into their system, so that the text is then sent back to the speech translation server 910 (or alternatively, directly to the query server 914 or to the SQSR 912).

The speech translation server 910 maintains a database of all transcribers that are currently logged-in and available to perform the service of transcription using a transcription software application on their transcription system 916 and 918. Alternatively, this function of tracking the availability of transcribers might be located on a remote system and/or might be implemented using a distributed mechanism among transcriber systems 916 and 918 (for example, using P2P mechanisms).

Queries from a graphical user interface (GUI) of the user computers 902a-902n can originate directly from the user, or like the speech queries, indirectly through a TQSR (Text Query Service Requestor) 906, which may be any software application or device connected via the Internet, for example As in the speech query, a user may be on a grocery store web site ordering food for delivery and may inquire about a recipe for a special dessert. This recipe query would be forwarded to the query server 914. Any web site, consumer electronics device, or other device may become a TQSR or SQSR for performing a search. For example, a set top box offered by a satellite TV or Cable TV provider could offer the ability to enter a query string and act as a TQSR or SQSR. Any software application running on a PC, such as Microsoft's Word or Excel, may also serve as a TQSR or SQSR.

Upon the receipt of a query, such as from user computer 902 in this example, the query server 914 may provide information (e.g. advertisements) to the user while the search is being processed. This information may relate to the query (or to the keywords of the query) and may include visual and audio information as appropriate for a source of the query. This information may include video, music, games, web links, etc. that will interact with and display for the user while the search is being performed.

The server 914 processes the arriving queries by determining which searchers are available to search for the information being requested, based upon factors such as the searcher being logged in, searchers who are signed up for a keyword, or category, or the ranking of the searcher based on previous performance. The server 914 may also determine if this particular query has been queried previously and send a response to the user with previously obtained search results without necessarily invoking a human searcher.

When no previous query results satisfying or that may satisfy the query are available, the server 914 may send the query to one or more of the available searchers over the communication system 908. If the query is a speech query, in addition to sending the text version of the query and the keywords, the speech recording of the query may be transmitted. The human searchers may be located at computer-based searcher tool systems 920a and 920b and/or speech-enabled computer-based searcher systems 922a and 922b.

A server-chosen searcher (or searchers) reviews the query, including the keywords and any speech recording and decides whether to accept the search. When the searcher accepts the search task, this acceptance may be communicated back to the user who originated the query through the server 914. In a situation where a searcher requires additional information or clarification, the searcher may send a request for additional information to the user, which may be sent through server 914 or via direct link to the user via the communication system 908. The searcher then uses the searcher tool system 920a through 922b to perform a search of publicly or privately available information to produce search results. For example, the searcher may use conventional tools, such as a browser, to access public databases via searches over the World Wide Web or private databases that may be accessible only to the searcher, such as a database of information previously gathered by the searcher, or from results stored on the query server 914 from other searchers, or from databases that require payment for access or even information available to the searcher in non-electronic form, such as a book on the searcher's bookshelf, test results from a personal experiment, etc.

The searcher may also submit the search query, or some version of it to an automated search tool such as the Google or AskJeeves systems. The search results, such as an answer, comments by the searcher, web pages, web links, and other query related information, etc. are gathered by the searcher during the search. The results of the search, such as web pages and links which the user can review or use to obtain the information desired, an answer to a question and web pages or links to web pages that support the answer, etc., is transmitted back to the user through the server 914 or directly to the user via the communications system 908. The information returned is typically what the searcher thinks or intends can satisfy the need of the user. The information can include anything that could satisfy the user, including a document, a video, a song, a configuration file, pictures, links, etc.

Figure 9:
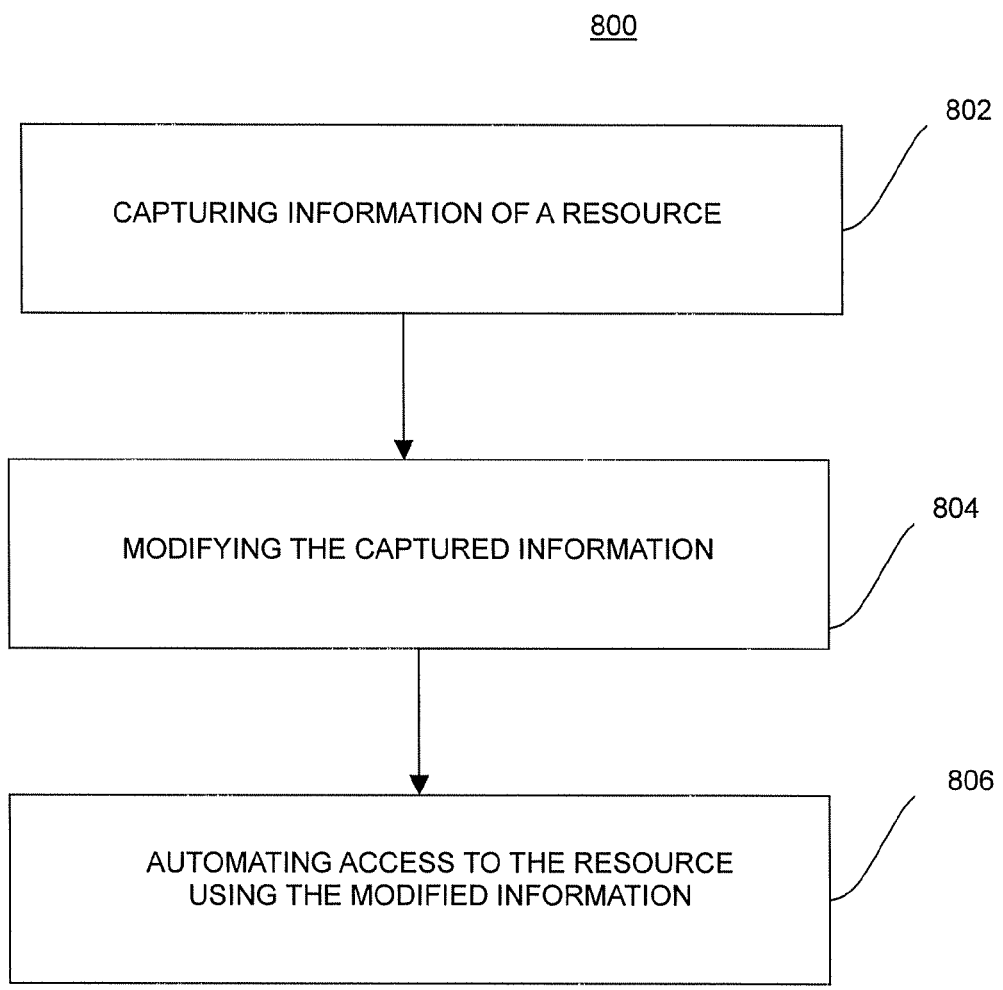
FIG. 9 depicts a flowchart for automating access to a resource.

An exemplary process 800 for automating access to a resource is illustrated in FIG. 9. As shown in FIG. 9, process 800 begins by capturing 802 information of a resource. For example, a URL string of a website such as WebMD, a sequence of operations executed to locate a resource (e.g., search engine, Internet directory, etc) is captured. Information identifying a resource path such as a URL may be automatically captured 902 or manually input by typing, copying and pasting the resource path using the pop-up window 320 (FIG. 3).

Subsequent to capturing 802 information of the resource, process 800 moves to modifying 804 the captured information. For example, the URL of the web site WebMD containing the keyword "diabetes" in the URL string that is accessed as a resource for obtaining data pertaining to "diabetes" may be replaced with "@@@." Subsequently, if a search is desired on the WebMD site, then the "@@@" may be replaced by another string such as "breast cancer" and submitted to a browser, whereupon a new phrase is searched. As such, a portion of the information of the resource path (e.g., the URL) related to unique content in a request or query for a search that has been encoded by a browser to access the resource is modified for subsequent use pertaining to the same or similar content.

After modifying 804 the captured information, process 800 moves to automating 806 access to the resource using the modified information. For example, subsequent access to the web site WebMD for a search pertaining to the keyword "diabetes" may be implemented using the modified information of the web site WebMD without requiring a user to re-execute the repetitive operations needed to access a specific portion of the web site containing the information with respect to the keyword "diabetes."

Accordingly, a human searcher or user (information seeker) may utilize the automated access to a particular resource to conduct a search without having to manually navigate to the resource. For example, if a user conducted a search pertaining to a WebMD magazine publication using Yahoo.com and determines that WebMD.com is the best source for information pertaining to the magazine, the disclosed system and method enable automated access to the specific portion of WebMD.com containing pertinent information.

The many features and advantages of the claimed invention are apparent from the detailed specification and, thus, it is intended by the appended claims to cover all such features and advantages of the claimed invention that fall within the true spirit and scope of the invention. Further, since numerous modifications and changes will readily occur to those skilled in the art, it is not desired to limit the invention to the exact construction and operation illustrated and described for the disclosed embodiments, and accordingly all suitable modifications and equivalents may be resorted to, falling within the scope of the claimed invention.

What is claimed is:

1. A method of creating a search macro for use with a computer, comprising:

reading a Uniform Resource Identifier;

parsing a message generated in response to activation of a search control of a web page retrieved using the Uniform Resource Identifier;

determining a domain name, a directory path, and a search string contained in the message;

enabling a macro absence indicator provided to a user when determining that the domain name, the directory path and the search string are not stored in a database;

storing the message in the database in association with the domain name, the directory path, a keyword selected by the user, and an identifier of the user when determining that the user has activated a button initiating creation of the search macro based on the message; and executing an automated search by activating the search macro in response to a query wherein the query is directed to the user when the user is a searcher signed up for the keyword.

2. The method of claim 1, further comprising:

searching the database for the macro including the Uniform Resource Identifier when receiving the web page.

3. The method of claim 1, further comprising generating a window in a graphical user interface that displays a portion of the message and a portion of the Uniform Resource Identifier when the button is activated.

4. The method of claim 3, wherein generating the window in the graphical user interface further comprises generating the window that displays at least one keyword, and reading input from the graphical user interface to determine whether to associate the keyword with the search macro in the database.

5. The method of claim 1, comprising:

loading the web page into a browser application; and determining the message based on content of the web page and a selection by the searcher of the search control from a plurality of search controls.

6. The method of claim 1, comprising:

loading the web page into a first application, and reading the Uniform Resource Identifier with the application comprises reading the Uniform Resource Identifier with a second application.

7. The method of claim 1, comprising:

loading content into a browser application when determining that the search macro is associated with the searcher;

receiving a request from the searcher; and executing the automated search based on the request and activation of a control indicating the search macro.

8. The method of claim 1, further comprising:

searching the database for the domain name, and setting a state of the indicator based on a result of the search.

9. The method of claim 8, wherein setting the state of the indicator comprises setting the button to active when the result of the search indicates that the domain name is not stored in the database.

10. A system, comprising;

a user system in communication with a network, wherein the user system comprises a graphical user interface; and a server in communication with the network, wherein the server comprises an information database;

wherein the user system includes an application that reads code for a web page, retrieves the web page based on a Uniform Resource Indicator, determines a message generated in response to activation of a search control of the web page, substitutes at least one placeholder for at least one search term in a search string of the message, the message is parsed to isolate a domain name, a directory path, and a search string and the message is stored as a basis for a macro in association with the domain name, the directory path, the search string, a keyword selected by a searcher, and an indicator of the searcher when determining that the domain name, and the directory path are not stored in the information database and that the searcher has elected to create the macro based on the message, and an automated search is executed by activating the macro in response to a query and where the query is provided to the searcher based on an association of the searcher with the keyword.

11. An article of manufacture comprising:

a computer usable medium having computer readable program code means embodied therein for causing a computer to assist a user submitting a query to a human searcher, the computer readable program code means in said article of manufacture comprising:

computer readable program code means for causing the computer to read a Uniform Resource Identifier;

computer readable program code means for causing the computer to determine a message generated by activation of a search control of a page retrieved by the Uniform Resource Identifier;

computer readable program code means for causing the computer to parse the message to isolate a domain name, a directory path, and a search string contained in the message;

computer readable program code means for causing the computer to enable a macro absence indicator provided to the human searcher when determining that the domain name, the directory path and the search string are not stored in a database;

computer readable program code means for causing the computer to store the search string in association with the domain name, the directory path, a keyword, and an identifier of the human searcher when determining that the human searcher has activated a button associated with the indicator; and computer readable program code means for causing the computer to execute an automated search by activating a search macro based on the message, where the query is provided to the human searcher based on an association of the human searcher with the keyword.

12. A method of creating a search macro for use with a computer, comprising:

reading a Uniform Resource Identifier of a resource and a page retrieved by the Uniform Resource Identifier;

searching a database for a macro including a domain name;

enabling a macro absence indicator when the macro is not found;

reading a source code of the page with an application;

analyzing the source code to determine a message generated when a search control of the page is activated;

selecting the search control by a searcher;

generating the message as a function of the source code and a placeholder inserted in a search field associated with the search control selected by a user;

parsing the message to isolate the domain name and a directory path of the message, storing the message in the database in association with the directory path, the domain name, a keyword selected by the searcher, and an identifier of the searcher when determining that the searcher has activated a button associated with the indicator; and executing an automated search by activating a macro based on the message in response to a query, where the query is provided to the searcher based on an association of the searcher with the keyword.

13. The method of claim 12, wherein the query is received from a user as a voice query.

14. The method of claim 12, further comprising:

generating a window in a graphical user interface that displays a portion of the message and a portion of the domain name.

15. The method of claim 14, wherein generating the window in the graphical user interface further comprises generating a window that displays at least one keyword, and reading input from the graphical user interface to determine whether to associate the keyword with the macro in the data structure.

16. The method of claim 12, comprising:
loading the page into a browser application.

17. The method of claim 12, comprising:
loading the page into a first application, and reading the Uniform Resource Identifier with the application comprises reading the Uniform Resource Identifier with a second application.

18. The method of claim 12, further comprising searching the database for the directory path, and a search string of the message, and setting a state of the indicator based on a result of the search.

19. A method of generating a Uniform Resource Identifier as a function of a search macro with a computer, comprising:
displaying a page in an application, where the page has a search field;
reading a macro from a data structure with the application based on a keyword used to direct queries to human searchers;
creating the macro based on parsing of a domain name and a directory path from a message generated by activation of a search control of a web page;
selecting the search control from a plurality of search controls of the web page;
providing the page to a searcher wherein the searcher is signed up for the keyword;
reading a search term of a query from the search field;
generating the Uniform Resource Identifier as a function of the macro and the search term of the query with the application when determining that the macro is a macro useable by the searcher;
transmitting the Uniform Resource Identifier with the application; and
retrieving a result associated with the Uniform Resource Identifier from a network with the application.

20. The method of claim 19, further comprising displaying a second page in the application, wherein the second page is a function of the result associated with the Uniform Resource Identifier.

21. A search apparatus using a macro, comprising:
a server device receiving a query from a speech enabled device,
determining whether the macro corresponding to a keyword of the query which is used to direct queries to human searchers is stored,
creating the macro based on parsing of a domain name and a directory path from a message generated by activation of a search control of a web page when a user selects a control enabled based on whether the macro comprising the domain name and the directory path is stored,
selecting the search control from a plurality of search controls provided in the web page based on an action of a human searcher;
executing a search responsive to the query using the macro when said determining indicates that the macro is stored, a user selects the macro, and the macro is designated as a public macro useable by other users, and
where said macro is stored in association with the domain name, said macro activates the search to produce a result for a search term received from the user, and a macro generation graphical user interface having search macro options enables the user to associate the keyword selected by the user with the macro.

22. The search apparatus of claim 21, wherein the result is provided to a human searcher register for the keyword.

23. A method for creating a search appliance comprising:
providing a search query including a placeholder to a search resource;
executing a search by the search resource using the search query;
obtaining a Uniform Resource Identifier causing the search resource to perform the search based on the search query, isolating information of the Uniform Resource Identifier including a domain name and a directory path;
enabling a macro creation facility provided to a user when determining that at least one of the domain name, the directory path and a search string based on the search query are not stored;
storing the domain name, the directory path and an identifier of the user in a database in association with a keyword when determining that the user has activated a control associated with the macro creation facility, said storing resulting in creation of a search macro;
receiving a request associated with the keyword;
searching the database for the search macro based on the keyword; and
retrieving a search result using the search macro when determining that the request is offered to the user based on an association of the user with the keyword.

* * * * *